United States Patent [19]
Jakubowski, Jr. et al.

[11] Patent Number: 5,904,323
[45] Date of Patent: May 18, 1999

[54] CONSTRAINED STORE RELEASE SYSTEM

[75] Inventors: Thaddeus Jakubowski, Jr., St. Charles; John K. Foster, Florissant, both of Mo.

[73] Assignee: McDonnell Douglas Corporation, St. Louis, Mo.

[21] Appl. No.: 08/846,181

[22] Filed: Apr. 28, 1997

[51] Int. Cl.⁶ ..................................................... B64D 1/02
[52] U.S. Cl. ...................... 244/137.4; 89/1.53; 294/82.26
[58] Field of Search ............................ 294/82.24, 82.26, 294/82.29, 88; 89/1.53, 1.54, 1.57–1.59; 244/137.4

[56] References Cited

U.S. PATENT DOCUMENTS

| | | | |
|---|---|---|---|
| 2,552,578 | 5/1951 | O'Mara et al. | 89/1.53 |
| 3,056,623 | 10/1962 | Herbert | 294/82.26 |
| 3,610,094 | 10/1971 | Craigie | 294/82.26 X |
| 4,183,480 | 1/1980 | Jakubowski | 244/137.4 |
| 4,196,879 | 4/1980 | Craigie | 244/137.4 |
| 4,318,561 | 3/1982 | Hasquenoph et al. | 294/82.26 |
| 4,441,674 | 4/1984 | Holtrop | 244/137.4 |
| 4,850,553 | 7/1989 | Takata et al. | 294/82.26 X |

*Primary Examiner*—Johnny D. Cherry
*Attorney, Agent, or Firm*—Westerlund & Powell, P.C.; Robert A. Westerlund; Raymond H.J. Powell, Jr.

[57] ABSTRACT

A store release system which includes a support member, such as a swaybrace, a store-nesting facility secured to the support member and articulated to facilitate orientation of the store-nesting facility to different positions in order to enable stores of different sizes to be nested thereagainst, and an ejection mechanism, such as a pneumatically or hydraulically-driven piston, for driving the support member from a retracted position to an extended position along a major axis (e.g., the yaw axis), in order to thereby release a store (e.g., a bomb or missile). The ejection mechanism is configured to drive the support member from the retracted position to the extended position with a vertical ejection force having a sufficient magnitude to counteract a laterally-directed force which would be required to unnest the store, to thereby constrain motion of the store in the yaw axis during an ejection cycle. In an exemplary embodiment, the store-nesting facility includes two or more spaced-apart footpads swivel-mounted to the underside of the support member.

6 Claims, 1 Drawing Sheet

U.S. Patent May 18, 1999 5,904,323
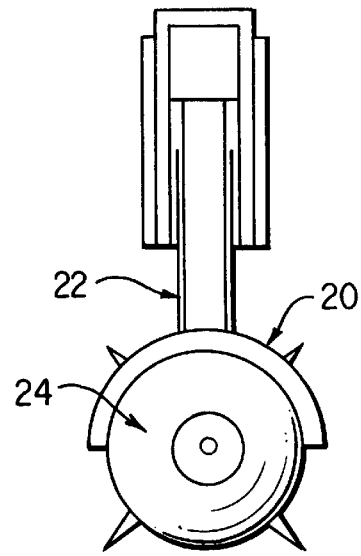
FIG. 1 PRIOR ART
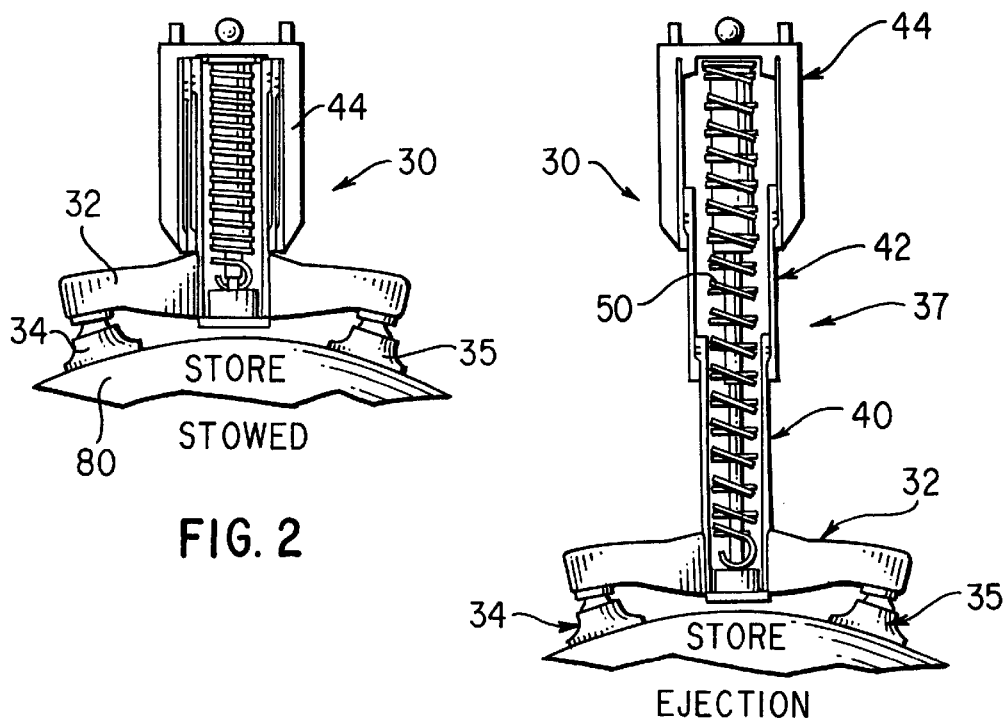
FIG. 2
FIG. 3

CONSTRAINED STORE RELEASE SYSTEM

BACKGROUND OF THE INVENTION

The present invention relates generally to weapon release systems, and more particularly, to a constrained store release system which has the capability of accomodating stores (e.g., bombs or missiles) of different sizes and shapes.

Most modern strike aircraft are designed to carry, release, and deliver on target a wide variety of weapons, such as bombs and missiles. The weapons carried and released in this manner are generally referred to as "stores". However, it will be appreciated by those skilled in the pertinent art that the term "stores" is not limited to weapons, but rather, is a generic term which broadly encompasses any item of cargo which is carried, released and delivered from the aircraft.

In this connection, modern strike aircraft are provided with suspension and release equipment (S&RE.) which is designed to carry the stores and to safely separate the stores from the aircraft. The S&RE typically comprise pyrotechnic-driven short-stroke pistons which are designed to rapidly accelerate the weapon through the adverse flow field close to the vehicle. These pistons impart only a point contact force to the stores and no facility is provided for controlling the stores during weapon release.

As strike aircraft have continued to fly faster and with greater maneuverability, the environment surrounding the aircraft has become more severe, thereby increasing the risk of store-to-store and/or store-to-aircraft collisions, and thereby reducing the delivery accuracy due to lateral dispersion. For certain types of stores, the employment envelope of the aircraft has been placarded to reduce the risk of store-to-store collisions and to increase delivery accuracy, but this measure has resulted in reduced survivability of the aircraft.

Several techniques have been developed to improve weapon separation from the aircraft and to increase delivery accuracy without the need to placard the employment envelope. One early technique entailed actively controlling the orientation of the stores and motion thereof during ejection in all three major axes, e.g., by physically retaining the store on a scissors-type carriage mechanism throughout the ejection stroke. This technique has been termed "controlled release". Another technique, dubbed "constrained release", entails preventing motion of the store throughout the ejection stroke, but only in one or two major axes, as opposed to all three major axes. For example, a device constructed to react against yaw moment and side loads during ejection would prevent or constrain motion in the yaw axis.

It has been demonstrated that a yaw axis constrained release system, especially when coupled with increased vertical end-of-stroke (VEOS) velocity and increased stroke length of the ejection piston, results in (1) a reduction in the store yaw angle throughout the ejection cycle, thereby resulting in a commensurate reduction in the cargo bay width for internally carried stores; (2) an improvement in the separation distance between the store and the aircraft during ejection (i.e., increased store-to-aircraft clearance); and, (3) a reduction in system-induced lateral dispersion, and thus, improved delivery accuracy. For internal carriage, such a yaw axis constrained release system affords substantial S&RE equipment size and weight reduction, as well as a reduction in the size of the cargo bay for a given set of stores. Further, since constrained release facilitates better weapon separation, this enables closer spacing of stores, additional flexibility in weapon station location, and a reduction in the number of test flights required to clear a store for an aircraft.

Several types of modern missile launchers, such as the LAU-106 and the LAU-116, incorporate a yaw axis constrained missile release system like the one depicted in FIG. 1. As can be seen, this yaw axis constrained missile release system includes a wrap-around yoke swaybrace which is driven by an ejector piston 22 from a stowed position to an ejection position to effect weapon release.

However, a significant limitation of the yaw axis constrained missile release system depicted in FIG. 1 is that the yoked swaybrace 20 is sized and configured to conform closely to the missile 24 which is nested therein, and thus, it is only suitable for use with a particular type of store (e.g., an air-to-air missile) having a particular store diameter.

Based on the above and foregoing, there presently exists a need in the art for a constrained store release system which overcomes the significant limitation of the above-described yaw axis constrained missile release system depicted in FIG. 1. The present invention fulfills this need in the art.

SUMMARY OF THE INVENTION

The present invention encompasses a store release system which includes a support member, such as a swaybrace, a store-nesting facility secured to the support member and articulated to facilitate orientation of the store-nesting facility to different positions in order to enable stores of different sizes to be nested thereagainst, and an ejection mechanism, such as a pneumatically or hydraulically-driven piston, for driving the support member from a retracted position to an extended position along a major axis (e.g., the yaw axis), in order to thereby release a store (e.g., a bomb or missile). The ejection mechanism is configured to drive the support member from the retracted position to the extended position with a vertical ejection force of sufficient magnitude to counteract a laterally-directed force which would be required to unnest the store, to thereby constrain motion of the store in the yaw axis during an ejection cycle. In an exemplary embodiment, the store-nesting facility includes two or more spaced-apart footpads swivel-mounted to the underside of the support member.

BRIEF DESCRIPTION OF THE DRAWINGS

The above and other objects, features, and advantages of the present invention will become apparent from the following detailed description read in conjunction with the accompanying drawings, in which:

FIG. 1 is an elevational, side view of a presently available yaw axis constrained missile release system;

FIG. 2 is an elevational, side view of a constrained store release system constructed in accordance with a presently preferred embodiment of the present invention, shown in the stowed position; and, FIG. 3 is an elevational, side view of a constrained store release system constructed in accordance with a presently preferred embodiment of the present invention, shown in the ejection position.

DETAILED DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

With reference now to FIGS. 2 and 3, there can be seen a yaw axis constrained store release system 30 constructed in accordance with a presently preferred embodiment of the present invention. As can be easily seen, the store release system 30 includes a swaybrace 32 having a pair of footpads 34, 35 swivel-mounted to the underside of the swaybrace 32 at opposite ends thereof, and an integral piston ejection mechanism 37 attached to the swaybrace 32 at a central location. The piston ejection mechanism 37 is preferably comprised of inner and outer telescoping pistons 40, 42, respectively which are sized to fit within an end housing 44 when the store release system 30 is in its stowed (retracted) position.

A return spring 50 is preferably disposed between the upper surface of the end housing 44 and the lower end of the inner piston 40. The end housing 44 is connected to any suitable pneumatic or hydraulic source (not shown) which can supply sufficient pressure to force the inner piston 40, the outer piston 42, and the attached swaybrace 32 from the stowed position shown in FIG. 2 to the ejection position shown in FIG. 3.

In order to ensure sufficient store-to-aircraft clearance and store delivery accuracy, the store release system 30 should provide adequate structural support in both the stowed and ejection positions, and should provide a vertical force sufficient to keep the store 80 nested against the swaybrace footpads 34, 35 throughout the ejection cycle. In connection with the latter point, it will be appreciated by those skilled in the pertinent art that the vertical force must be sufficient to counteract the side (lateral) force required to "unnest" the store 80, in order to keep the store 80 nested throughout the ejection cycle.

The end housing 44 can be attached to the weapon delivery station (not shown) of an aircraft (not shown) in any convenient manner well-known to those skilled in the pertinent art. In general, it will be appreciated that the store release system 30 of the present invention can be utilized in conjunction with virtually any type of weapon delivery system, e.g., internal weapon carriage and constrained release, external pylon weapon carriage and constrained release, conformal and tangential external weapon carriage and constrained release, and external weapon carriage and constrained release from multiple ejector racks.

As will be recognized by those skilled in the pertinent art, the constrained store release system 30 of the present invention can accommodate stores (e.g., bombs and missiles) of various types (e.g., air-to-air, air-to-ground, etc.), shapes and sizes, whereas the presently available yaw constrained missile release system 20 depicted in FIG. 1 is limited in its use to only one specific type and size of missile. More particularly, since the swaybrace footpads 34, 35 can swivel, their position can be easily adjusted to enable a broad range of different shapes and sizes of stores to be nested thereagainst. For example, it is presently contemplated that a practical application of the present invention would be easily able to accommodate stores ranging in size from a diameter of about 6" to a diameter of about 36", although these sizes are of course not limiting to the present invention.

Although a presently preferred embodiment of the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

For example, although the store release system depicted in FIGS. 2 and 3 utilizes only one pair of swaybrace footpads, it will be easily recognized that this is not limiting to the present invention, as any suitable number of spaced-apart, articulated footpads can be utilized without departing from the spirit and scope of the present invention. Additionally, although the disclosed embodiment of the store-nesting facility requires manual adjustment of the position of the swaybrace footpads in order to accommodate stores of different sizes and shapes, it should be clearly understood that the present invention also embraces store-nesting facilities whose position is automatically or semi-automatically adjustable. A suitable swaybracing arrangement which has the facility to automatically adjust its position to accommodate stores of different shapes and sizes for carriage (but not for store ejection/release) is disclosed in U.S. Pat. No. 4,183,480, issued to Thaddeus Jakubowski, Jr., who is one of the co-inventors of the present invention. The disclosure of this patent is fully incorporated herein by reference.

Further, it should be clearly understood that any suitable alternative store-nesting facility can be utilized in place of the swivel-mounted footpads, so long as the store-nesting facility is articulated for movement to different positions in order to accommodate stores of different shapes and/or sizes.

Moreover, it should be clearly understood that the particular type of ejection mechanism utilized in the practice of the present invention is not limiting thereto, e.g., a single-stroke (non-telescoping) piston or any other suitable pneumatic, hydraulic, or pyrotechnic ejection mechanism well-known to those skilled in the pertinent art can be utilized within the scope of the present invention.

In general, it is not intended that the present invention be limited in its scope to the specific embodiments disclosed herein. Rather, it is intended that the scope of the present invention be defined by the appended claims.

What is claimed is:

1. A store release system for aircraft, comprising:
    a swaybrace having an underside and opposite lateral ends;
    at least two-spaced apart footpads swivel-mounted to the underside of the swaybrace at respective locations adjacent opposite ends of the swaybrace, whereby the orientation of the footpads being adjustable via swiveling so as to enable stores of different sizes to be nested against the footpads;
    a piston ejection mechanism supported for reciprocal movement within a housing that is fastenable to an aircraft, wherein the piston ejection mechanism is attached to the swaybrace and the piston ejection mechanism is configured for and capable of driving the swaybrace from a retracted stowing position to an extended release position along a yaw axis in order to release a store at the extended release position with a vertical ejection force which is sufficient to constrain motion of the store in the yaw axis during an ejection cycle.

2. The store release system as set forth in claim 1, wherein the piston ejection mechanism comprises:
    an outer piston mounted for telescoping movement with respect to the housing; and
    an inner piston having a smaller diameter than the outer piston and mounted for telescoping movement with respect to the outer piston, wherein the inner piston is attached to the sway brace, and wherein the inner and outer telescoping pistons are extendible in the direction of the extended release position during an ejection cycle with the inner telescoping piston extendible the furthest from the housing.

3. The store release system as set forth in claim 1, wherein the piston ejection mechanism comprises:

an outer piston mounted for telescoping movement with respect to the housing;

an inner piston having a smaller diameter than the outer piston and mounted for telescoping movement with respect to the outer piston, wherein the inner piston is attached to the sway brace, and wherein the inner and outer telescoping pistons are extendible in the direction of the extended release position during an ejection cycle with the inner telescoping piston extendible the furthest from the housing; and a return spring is disposed between an upper surface of the housing and a lower end of the inner piston.

4. A store release system for aircraft, comprising:

a swaybrace having an underside and opposite lateral ends;

at least two-spaced apart footpads swivel-mounted to the underside of the swaybrace at respective locations adjacent opposite ends of the swaybrace, whereby the orientation of the footpads being adjustable via swiveling so as to enable stores of different sizes to be nested against the footpads; and a piston ejection mechanism supported for reciprocal movement within a housing that is fastenable to an aircraft, wherein the piston ejection mechanism is attached to the swaybrace and the piston ejection mechanism is configured for and capable of driving the swaybrace from a retracted stowing position to an extended release position along a yaw axis in order to release a store at the extended release position with a vertical ejection force sufficient to constrain motion of the store in the yaw axis during an ejection cycle, and wherein the footpads are vertically movable along the yaw axis by retractable extension means consisting of the piston ejection mechanism acting upon the swaybrace.

5. The store release system as set forth in claim 4, wherein the piston ejection mechanism comprises:

an outer piston mounted for telescoping movement with respect to the housing; and an inner piston having a smaller diameter than the outer piston and mounted for telescoping movement with respect to the outer piston, wherein the inner piston is attached to the sway brace, and wherein the inner and outer telescoping pistons are extendible in the direction of the extended release position during an ejection cycle with the inner telescoping piston extendible the furthest from the housing.

6. The store release system as set forth in claim 4, wherein the piston ejection mechanism comprises:

an outer piston mounted for telescoping movement with respect to the housing;

an inner piston having a smaller diameter than the outer piston and mounted for telescoping movement with respect to the outer piston, wherein the inner piston is attached to the sway brace, and wherein the inner and outer telescoping pistons are extendible in the direction of the extended release position during an ejection cycle with the inner telescoping piston extendible the furthest from the housing; and a return spring is disposed between an upper surface of the housing and a lower end of the inner piston.

* * * * *